US012036772B2

United States Patent
McCloud

(10) Patent No.: US 12,036,772 B2
(45) Date of Patent: Jul. 16, 2024

(54) COMPOSITE STRUCTURE WITH MOLDED-IN WOOD SURFACE

(71) Applicant: Wabash National, L.P., Lafayette, IN (US)

(72) Inventor: Travis Smith McCloud, Malabar, FL (US)

(73) Assignee: Wabash National, L.P., Lafayette, IN (US)

(*) Notice: Subject to any disclaimer, the term of this patent is extended or adjusted under 35 U.S.C. 154(b) by 323 days.

(21) Appl. No.: 17/019,605

(22) Filed: Sep. 14, 2020

(65) Prior Publication Data

US 2021/0086483 A1 Mar. 25, 2021

Related U.S. Application Data

(60) Provisional application No. 62/903,188, filed on Sep. 20, 2019.

(51) Int. Cl.
*B32B 21/08* (2006.01)
*B32B 3/30* (2006.01)
(Continued)

(52) U.S. Cl.
CPC ............... *B32B 21/08* (2013.01); *B32B 3/30* (2013.01); *B32B 5/02* (2013.01); *B32B 7/12* (2013.01); *B32B 27/40* (2013.01); *C09J 133/04* (2013.01); *C09J 163/00* (2013.01); *C09J 167/00* (2013.01); *E04F 15/02161* (2013.01); *B32B 2305/08* (2013.01); *B32B 2305/18* (2013.01); *B32B 2305/72* (2013.01); *B32B 2305/74* (2013.01); *B32B 2471/00* (2013.01); *E04F 2201/041* (2013.01)

(58) Field of Classification Search
CPC .......... E04F 15/02161; E04F 2201/041; B32B 21/08; B32B 3/30; B32B 5/02; B32B 7/12; B32B 27/40; B32B 2305/08; B32B 2305/18; B32B 2305/72; B32B 2305/74; B32B 2471/00; C09J 133/04; C09J 163/00; C09J 167/00

See application file for complete search history.

(56) References Cited

U.S. PATENT DOCUMENTS 4,921,658 A 5/1990 Pennington et al.
5,429,066 A 7/1995 Lewit et al.
(Continued)

FOREIGN PATENT DOCUMENTS

DE 102014107537 A1 12/2015

*Primary Examiner* — Scott R. Walshon
(74) *Attorney, Agent, or Firm* — Faegre Drinker Biddle & Reath LLP

(57) ABSTRACT

A composite structure is disclosed having a fiber-reinforce plastic and a wood layer. The wood layer includes an upper surface and a lower surface opposite the upper surface. At least a portion of the lower surface includes at least one engagement feature. A co-cure adhesive layer is applied to the lower surface of the wood layer. The co-cure adhesive layer bonds the fiber-reinforced plastic and the layer. The co-cure adhesive layer comprises at least one elastomer and at least one resin selected from a vinyl ester resin, a polyester resin, and an epoxy resin. The at least one engagement feature may comprise at least one of a groove, a dovetail groove, a curved groove, and a hole.

16 Claims, 8 Drawing Sheets

(51) Int. Cl.
*B32B 5/02* (2006.01)
*B32B 7/12* (2006.01)
*B32B 27/40* (2006.01)
*C09J 133/04* (2006.01)
*C09J 163/00* (2006.01)
*C09J 167/00* (2006.01)
*E04F 15/02* (2006.01)

(56) References Cited

U.S. PATENT DOCUMENTS

| | | | |
|---|---|---|---|
| 5,664,518 A | 9/1997 | Lewit et al. | |
| 5,800,749 A | 9/1998 | Lewit et al. | |
| 5,830,308 A | 11/1998 | Reichard | |
| 5,897,818 A | 4/1999 | Lewit et al. | |
| 5,908,591 A | 6/1999 | Lewit et al. | |
| 6,004,492 A | 12/1999 | Lewit et al. | |
| 6,013,213 A | 1/2000 | Lewit et al. | |
| 6,179,942 B1 * | 1/2001 | Padmanabhan | B32B 21/08 428/537.1 |
| 6,206,669 B1 | 3/2001 | Lewit et al. | |
| 6,247,747 B1 | 6/2001 | Kawanomoto et al. | |
| 6,496,190 B1 | 12/2002 | Driemeyer et al. | |
| 6,497,190 B1 | 12/2002 | Lewit | |
| 6,543,469 B2 | 4/2003 | Lewit et al. | |
| 6,723,273 B2 | 4/2004 | Johnson et al. | |
| 6,755,998 B1 | 6/2004 | Reichard et al. | |
| 6,808,788 B2 | 10/2004 | Bogner | |
| 6,869,561 B2 | 3/2005 | Johnson et al. | |
| 6,911,252 B2 | 6/2005 | Lewit et al. | |
| 7,856,785 B2 * | 12/2010 | Pervan | E04F 15/02 52/390 |
| 8,474,871 B1 | 7/2013 | Ludwick | |
| 9,181,701 B2 * | 11/2015 | Hofmann | E04C 3/14 |
| 9,371,468 B2 | 6/2016 | Lewit | |
| 10,239,265 B2 | 3/2019 | Lewit et al. | |
| 2006/0080927 A1 * | 4/2006 | Schulte | E04F 15/10 52/592.1 |
| 2006/0156663 A1 * | 7/2006 | Mao | E04F 15/22 156/60 |
| 2014/0199551 A1 | 7/2014 | Lewit | |
| 2014/0245681 A1 * | 9/2014 | Carrubba | E04F 13/0894 52/404.4 |
| 2014/0298997 A1 * | 10/2014 | Lee | E04F 13/10 156/62.2 |
| 2015/0239507 A1 * | 8/2015 | Padmanabhan | B32B 27/20 296/184.1 |
| 2016/0222597 A1 * | 8/2016 | Penland, Jr. | E01C 5/18 |
| 2016/0263873 A1 | 9/2016 | Lewit | |
| 2017/0239916 A1 | 8/2017 | Lewit et al. | |
| 2020/0276770 A1 * | 9/2020 | Zheng | B32B 37/1292 |

* cited by examiner

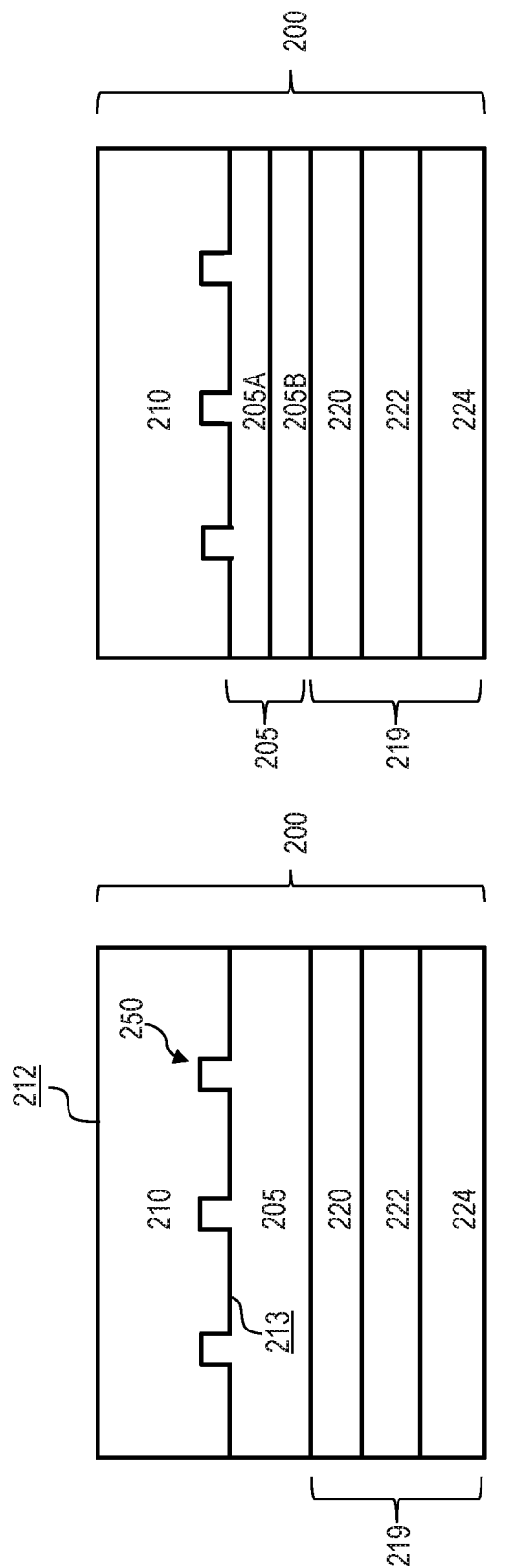

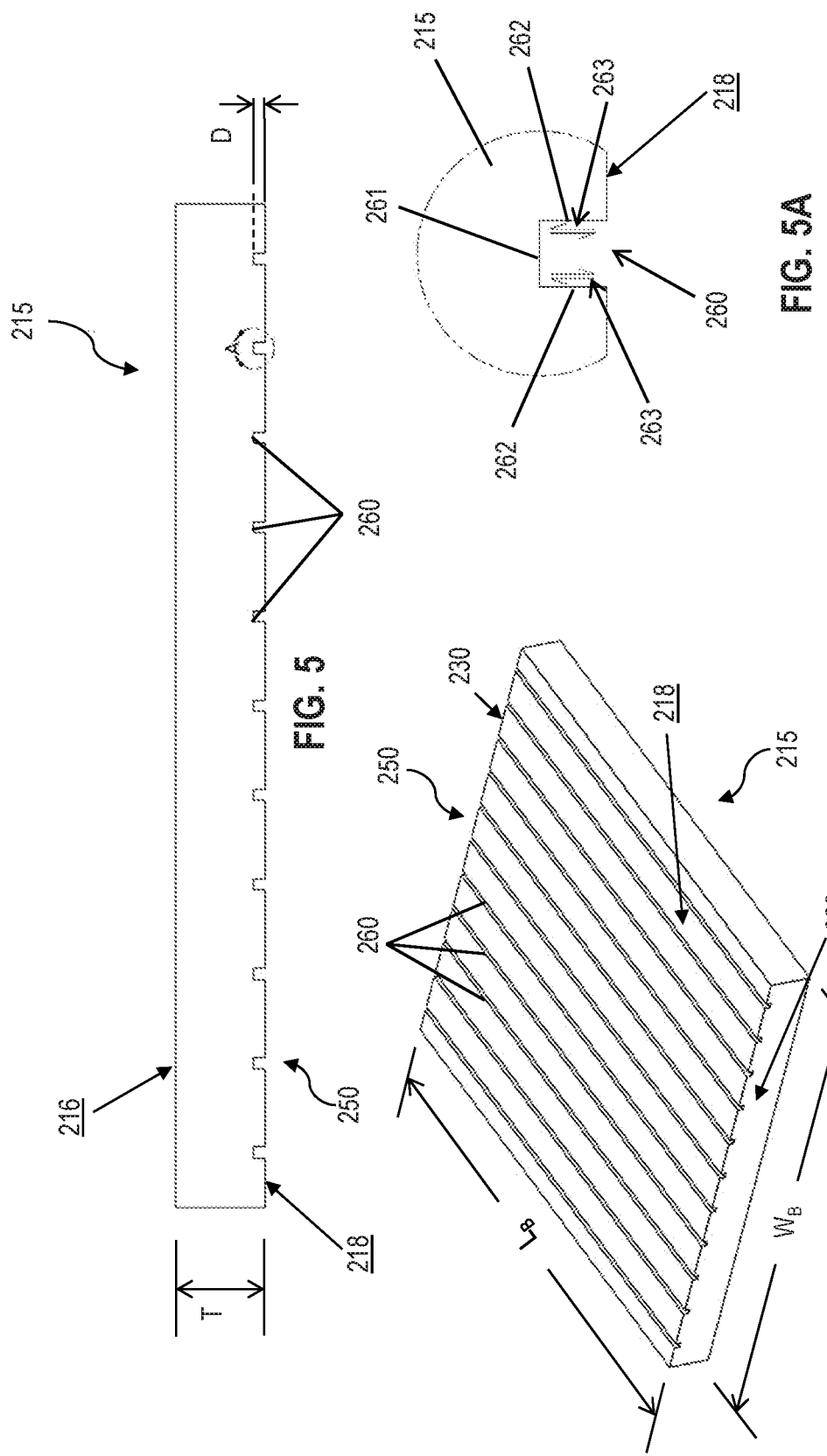

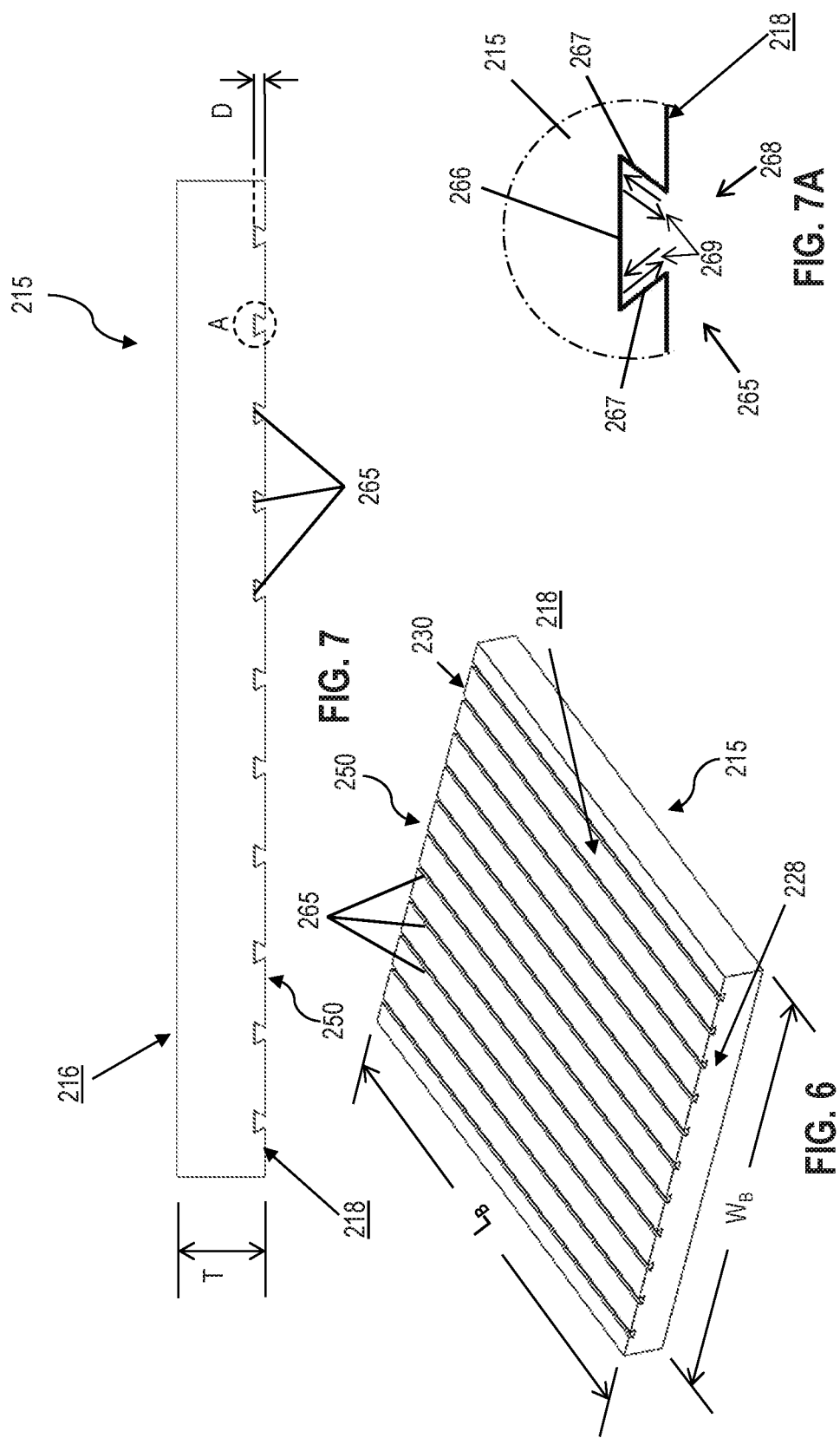

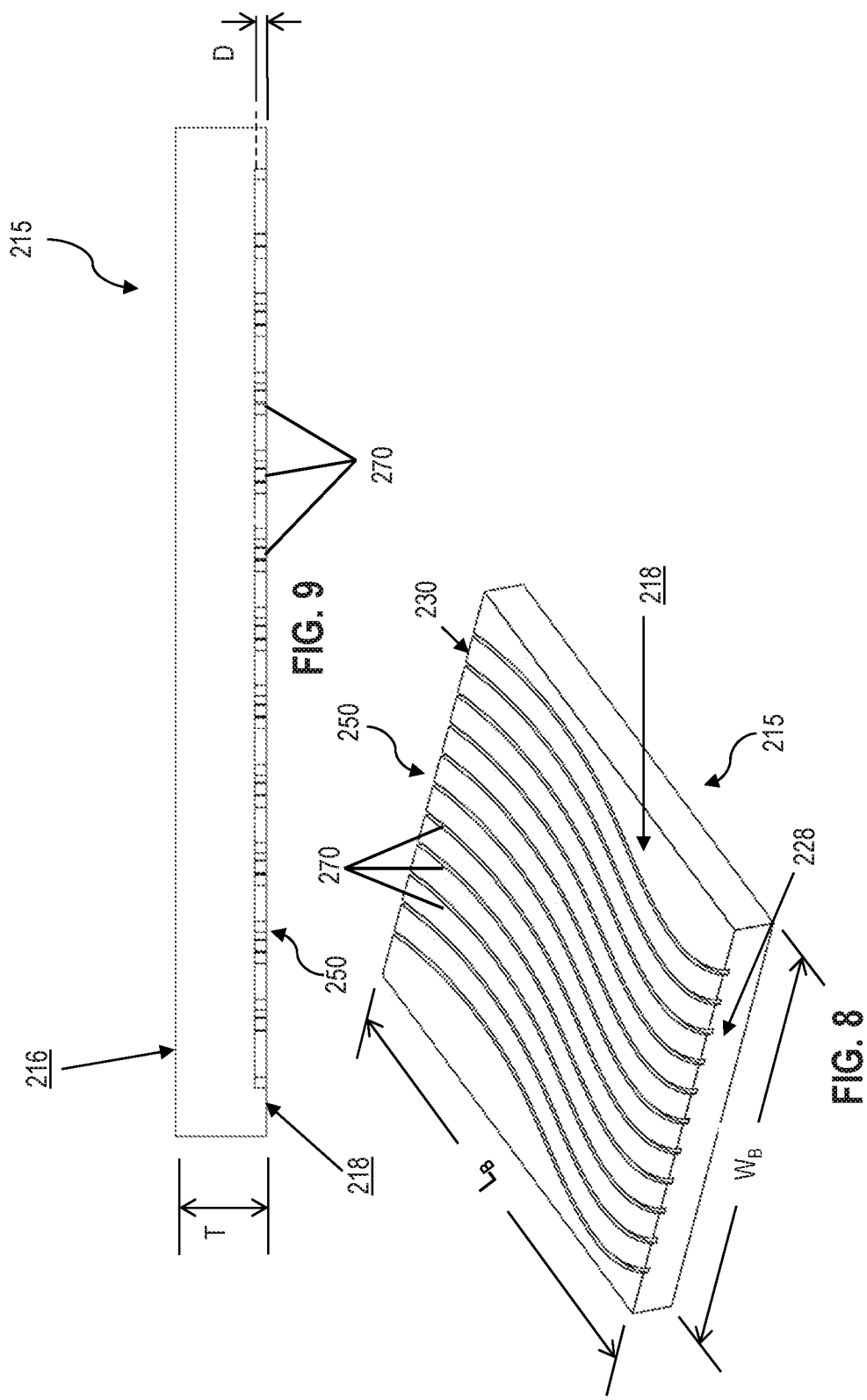

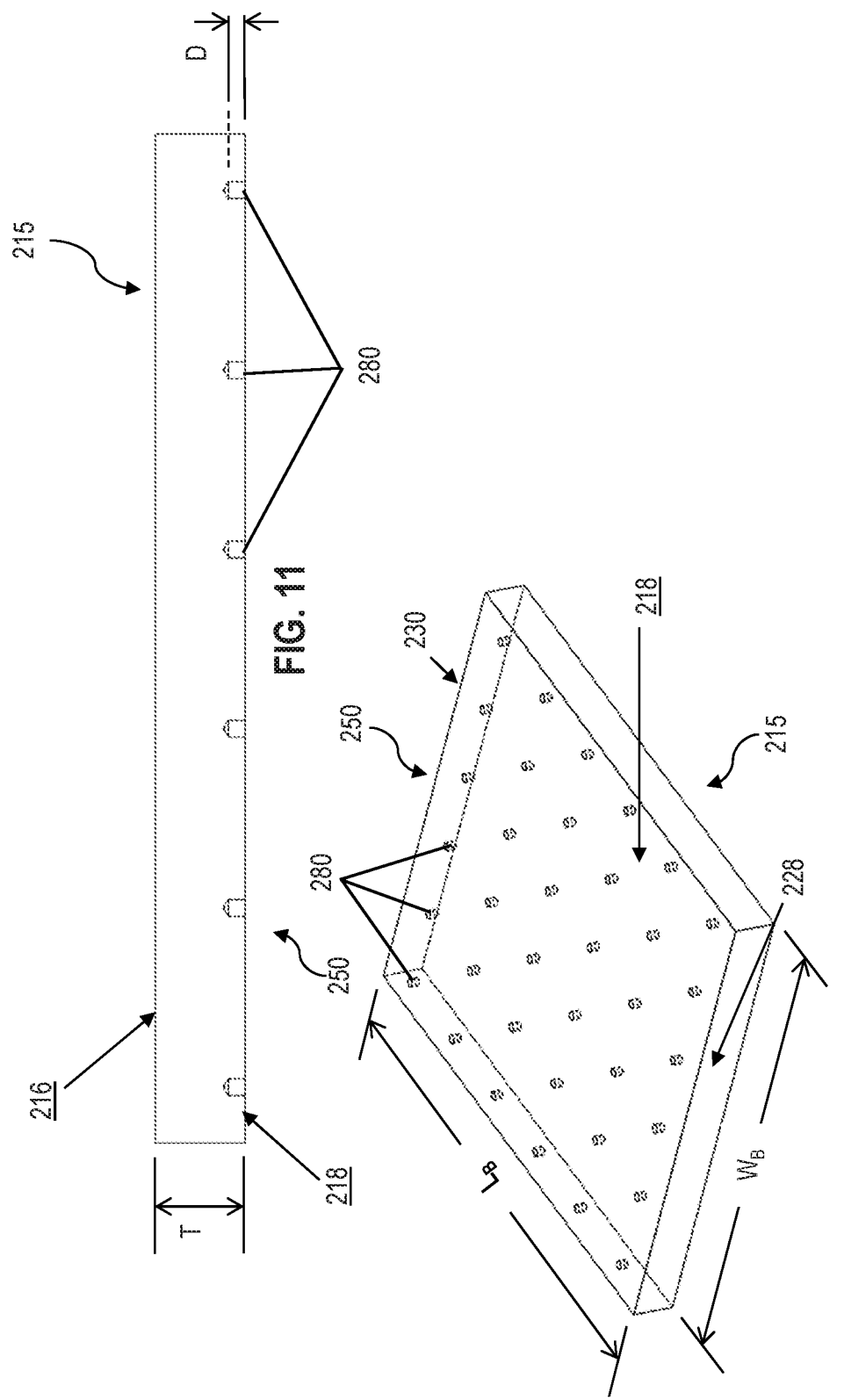

COMPOSITE STRUCTURE WITH MOLDED-IN WOOD SURFACE

CROSS-REFERENCE TO RELATED APPLICATION

This application claims priority to U.S. Provisional Patent Application Ser. No. 62/903,188, filed Sep. 20, 2019, the disclosure of which is hereby expressly incorporated by reference herein in its entirety.

FIELD OF THE DISCLOSURE

The present disclosure relates generally to composites formed from co-cure adhesive materials and methods of making the same. More particularly, the present disclosure relates to hybrid laminated composites of wood and polymer-based materials such as fiber-reinforced plastics (FRP) useful in cargo vehicles and other applications, and to methods of making the same.

BACKGROUND OF THE DISCLOSURE

Cargo vehicles are used in the transportation industry for transporting many different types of cargo. Many cargo vehicles are constructed with metal, leading to corrosion over time and an increase in the weight of the vehicle. Some cargo vehicles are constructed with wood, but this wood may be susceptible to degradation, especially in harsh environmental conditions.

SUMMARY

The present disclosure provides a composite structure comprising a fiber-reinforced plastic, a wood layer, and a co-cure adhesive bonding the fiber-reinforced plastic and the wood layer. The co-cure adhesive comprises at least one elastomer, and at least one resin selected from a vinyl ester resin, a polyester resin, and an epoxy resin. In this way, the wood layer may become molded-in with the fiber-reinforced plastic to form a hybrid laminated wood fiber-reinforced plastic composite structure. Cargo vehicles may be constructed using such composite structures with molded-in wood, which may lead to an absence of or reduction in metallic materials and associated advantages, including simplified construction, thermal efficiency, reduced water intrusion and corrosion, and improved fuel efficiency through weight reduction, for example.

According to an embodiment of the present disclosure, a composite structure is provided including a fiber-reinforced plastic and a wood layer. The wood layer includes an upper surface and a lower surface opposite the upper surface. At least a portion of the lower surface of the wood layer includes at least one engagement feature. The composite structure also includes a co-cure adhesive layer applied to the lower surface of the wood layer. The co-cure adhesive layer bonds the fiber-reinforced plastic and the wood layer, wherein the co-cure adhesive layer comprises at least one elastomer and at least one resin selected form a vinyl ester resin, polyester resin, and an epoxy resin.

According to a further embodiment of the present disclosure, a composite floor structure is provided comprising a platform having an upper wood surface. The upper wood surface includes a lower surface having at least one engagement feature. The composite floor structure further includes at least one fabric-reinforced plastic layer positioned adjacent the lower surface of the upper wood surface and a co-cure adhesive layer applied to the lower surface of the upper wood surface. The co-cure adhesive layer bonds the upper wood surface and the at least one of the fiber-reinforced plastic layers. The co-cure adhesive layer comprises at least one elastomer and at least one resin selected from a vinyl ester resin, a polyester resin, and an epoxy resin.

According to yet another embodiment of the present disclosure, a method of bonding a fiber-reinforced plastic to a wood panel to form a composite structure is provided. The method comprises applying an adhesive to a first surface of the wood to form a co-cure adhesive layer wherein the adhesive is a co-cure adhesive comprising at least one elastomer and at least one resin selected from a vinyl ester resin, a polyester resin, and an epoxy resin. The method further comprises contacting the co-cure adhesive layer with a reinforcing layer and a laminating resin, and curing the laminating resin to form a fiber-reinforced plastic, wherein the fiber-reinforced plastic is bonded to the wood by the co-cure adhesive layer.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings.

FIGS. 3A and 3B are schematic cross-sectional views of the platform of FIG. 1;

FIG. 4 is a bottom perspective view of an embodiment of a wood plank of the top layer of the platform of FIG. 1, showing a first engagement feature in the bottom of the wood plank;

FIG. 5 is a cross-sectional view of the wood plank of FIG. 4;

FIG. 5A is an enlarged view of the first engagement feature of the wood plank circled and labeled "A" in FIG. 5;

FIG. 6 is a bottom perspective view of another embodiment of a wood plank of the top layer of the platform of FIG. 1, showing a second engagement feature in the bottom of the wood plank;

FIG. 7 is a cross-sectional view of the wood plank of FIG. 6;

FIG. 7A is an enlarged view of the second engagement feature of the wood plank circled and labeled "A" in FIG. 7;

FIG. 8 is a bottom perspective view of a further embodiment of a wood plank of the top layer of the platform of FIG. 1, showing a third engagement feature in the bottom of the wood plank;

FIG. 9 is a cross-sectional view of the wood plank of FIG. 8;

FIG. 10 is bottom perspective view of another embodiment of a wood plank of the top layer of the platform of FIG. 1, showing a fourth engagement feature in the bottom of the wood plank;

FIG. 11 is a cross-sectional view of the wood plank of FIG. 10; and

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
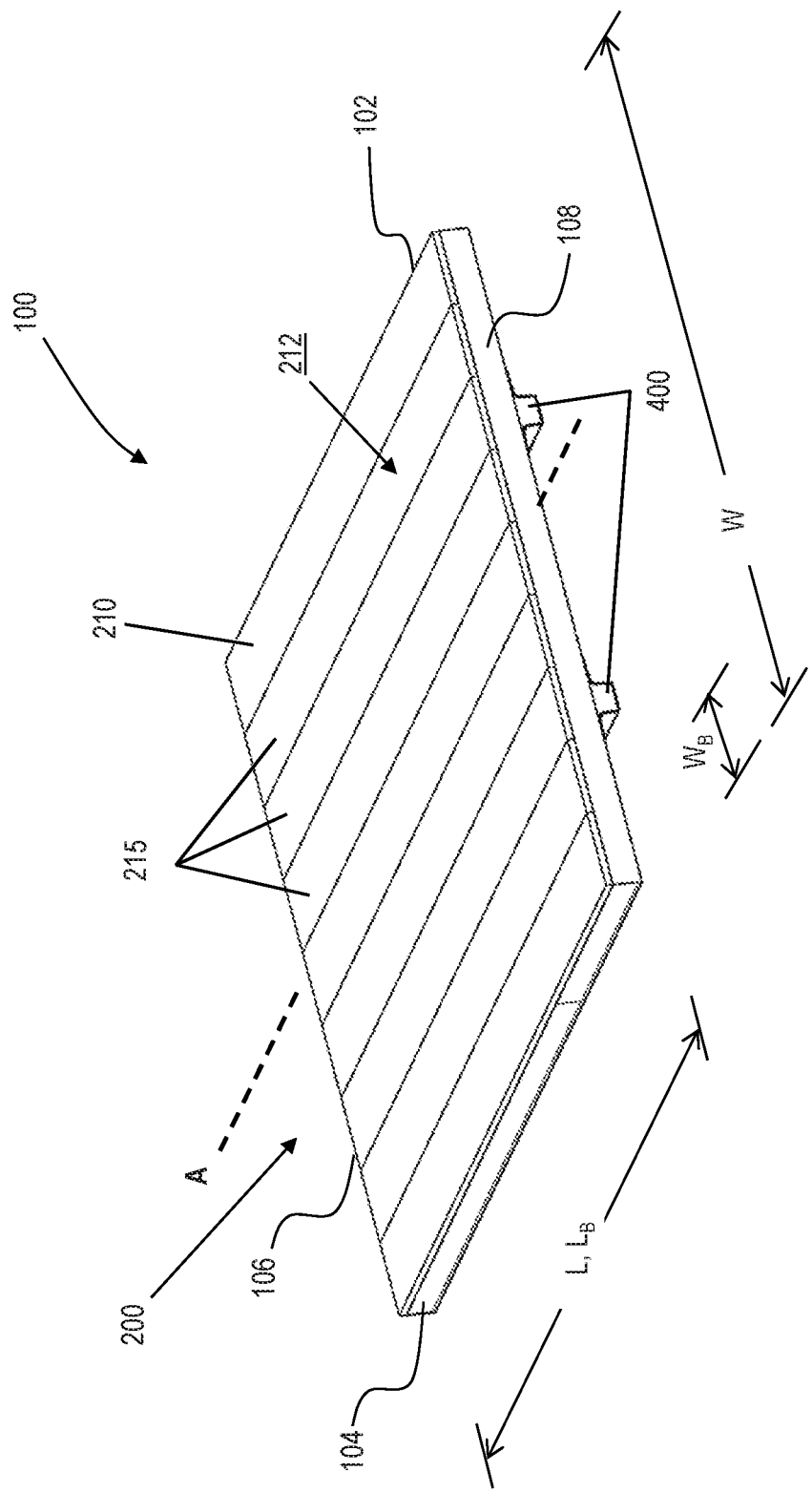
FIG. 1 is a top perspective view of an exemplary composite floor structure of the present disclosure, the composite floor structure including a platform including a top layer, a plurality of transverse beams, and a plurality of longitudinal beams.

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

A composite structure is disclosed. In one exemplary embodiment, the composite structure includes a wood layer, a fabric-reinforced plastic, and a co-cure adhesive bonding the fiber-reinforced plastic and the wood layer. In some embodiments, the composite may be a hybrid laminated wood fiber-reinforced composite.

1. Co-Cure Adhesive

In one exemplary embodiment, a composite structure including a co-cure adhesive is provided. In an illustrative embodiment, the co-cure adhesive comprises one or more elastomer components, such as urethane, co-cured with one or more resin components, such as a vinyl ester, epoxy, or unsaturated polyester components. Exemplary co-cure adhesives are provided in U.S. Pat. No. 9,371,468 and US Publication No. 2016/0263873, the disclosures of which are hereby incorporated by reference in their entireties.

As used herein, co-cured refers to the reactions involved in curing the urethane polymer take place essentially concurrently with the reactions involved in curing the one or more resin components, such as vinyl ester, epoxy, or unsaturated polyester component. Co-cured products are distinguishable from interpenetrating networks (IPN), at least in that co-cured products can have some reactions between the chains of the polymerized urethane component and the one or more resin components, such as cured vinyl ester, epoxy, or unsaturated polyester component.

In one exemplary embodiment, the urethane component is formed from urethane reactants, such as polyisocyanates, isocyanate-terminated prepolymers, polyols, and chain extenders. Exemplary polyisocyanates include aromatic polyisocyanates such toluene diisocyanates (TDI), 4,4'-diphenylmethane diisocyanates (MDI), and polymeric diisocyanates (PMDI), and aliphatic polyisocyanates such as hexamethylene diisocyanate (HDI), hydrogenated MDI, cyclohexane diisocyanate (CHDI), isophorone diisocyanate (IPDI), trimethyl and tetramethylhexamethylene diisocyanate (TMXDI). Exemplary isocyanate-terminated prepolymers are formed from a polyisocyanate and a polyol. Exemplary polyols have a molecular weight from 500 to 10,000 Dalton and include two to six functional groups, such as hydroxyl or amine-terminated polyether or polyester polyols, or more particularly a polyether or polyester diol or triol. Other exemplary polyols include alkoxylated sucrose polyols. Exemplary chain extenders include low-molecular-weight diols or diamines such as ethylene glycol, diethylene glycol, 1,4-butanediol, 1,6-hexanediol, ethylene diamine, 4,4'-methylene-bis(2-chloroaniline) ("MOCA"). Exemplary urethane systems include one and two components systems. Exemplary urethane systems also include pure urethane systems, i.e. systems including hydroxyl-terminated reactants only, polyurea systems, i.e. amine-terminated polyols and/or amine extenders, as well as combinations and mixtures thereof. Exemplary commercially available urethane components include a two-component polyurethane based on an aliphatic polyisocyanate available from BASF under the trade name Selby™ N300 CR and combinations of the same with polyureas such as EnviroLastic® resin available from Sherwin-Williams or Line-X® resin available from Line-X, Inc.

Exemplary polyester and vinyl esters are produced by combining an unsaturated polyester resin or vinyl ester resin with an ethylenic monomer, usually styrene, and a free-radical initiator. Exemplary unsaturated polyester resins include polymers of intermediate molecular weight made by condensing glycols, maleic anhydride, and dicarboxylic acids or their anhydrides to produce a resin. Exemplary glycols include ethylene glycol, propylene glycol, diethylene glycol, dipropylene glycol, alkoxylated bisphenol A, cyclohexane dimethanol, and neopentyl glycol. Maleic anhydride provides a crosslinkable carbon-carbon double bond capable of reacting with the ethylenic monomer in the presence of the free-radical initiator. Exemplary dicarboxylic acids and anhydrides include phthalic anhydride, isophthalic acid (which produces an isophthalic polyester resin), terephthalic acid, adipic acid, succinic acid, tetrabromophthalic anhydride, tetrahydrophthalic anhydride, maleic acid, fumaric acid, and the like.

Exemplary ethylenic monomers include, for example styrene, α-methylstyrene, divinylbenzene, methyl methacrylate, butyl acrylate, and vinyl toluene. In one exemplary embodiment, the ethylenic monomer is styrene.

Exemplary vinyl esters are formed from a reaction of an epoxy resin and an unsaturated carboxylic acid such as acrylic acid or methacrylic acid. In one exemplary embodiment, the epoxy resin is a product of bisphenol A with epichlorohydrin, further reacted with methacrylic acid to convert the epoxide end groups to vinyl ester groups.

Exemplary epoxies are formed from a reaction of an epoxy resin, such as a diglycidyl ether reaction product of bisphenol A with epichlorohydrin, with a curing agent such as an aromatic diamine. Exemplary curing agents for epoxy resins include aliphatic amines, cycloaliphatic amines, aromatic amines, polyamides, amidoamines, polysulfides, and anhydrides. In one exemplary embodiment, the resin components include an epoxy and an unsaturated polyester resin, such as isophthalic polyester resin, in combination.

In one exemplary embodiment, the co-cure adhesive includes as little as 5 wt. %, 10 wt. %, 15 wt. %, 20 wt. %, 25 wt. %, 30 wt. %, as great as 40 wt. %, 50 wt. %, 60 wt. %, 70 wt. %, 80 wt. %, 90 wt. %, or 95 wt. % of the urethane component based on the total weight of the co-cure adhesive, or within any range defined between any two of the foregoing values, such as 5 wt. % to 95 wt. %, 10 wt. % to 25 wt. %, 15 wt. % to 25 wt. %, or 50 wt. % to 95 wt. %. In one embodiment, the co-cure adhesive includes from 10 wt. % to 30 wt. % urethane, more specifically from 15 wt. % to 25 wt. % urethane.

In one exemplary embodiment, the co-cure adhesive includes as little as 5 wt. %, 10 wt. %, 20 wt. %, 30 wt. %, 40 wt. %, 50 wt. %, as great as 60 wt. %, 70 wt. %, 75 wt.

%, 80 wt. %, 85 wt. %, 90 wt. %, or 95 wt. % of the one or more resin components, such as vinyl ester, epoxy, or unsaturated polyester component, based on the total weight of the co-cure adhesive, or within any range defined between any two of the foregoing values, such as 5 wt. % to 95 wt. %, 75 wt. % to 90 wt. %, or 5 wt. % to 50 wt. %.

Without wishing to be held to any particular theory, it is believed that increasing the percentage of urethane component increases the flexibility of the cured adhesive. Accordingly, in an embodiment directed to a relatively rigid composite, the co-cure adhesive may include a relatively lower amount of urethane, such as 5 wt. % to 50 wt. % or 10 wt. % to 25 wt. %, based on the total weight of the co-cure adhesive. Similarly, in an embodiment directed to a relatively flexible composite, or to an embodiment including a wood to composite interface capable of withstanding relatively large deformations, shocks, or blast loads, the co-cure adhesive may include a relatively higher amount of urethane, such as 30 wt. % to 95 wt. %, 50 wt. % to 95 wt. %, or 70 wt. % to 90 wt. %, based on the total weight of the co-cure adhesive.

2. Floor Structure

Figure 2:
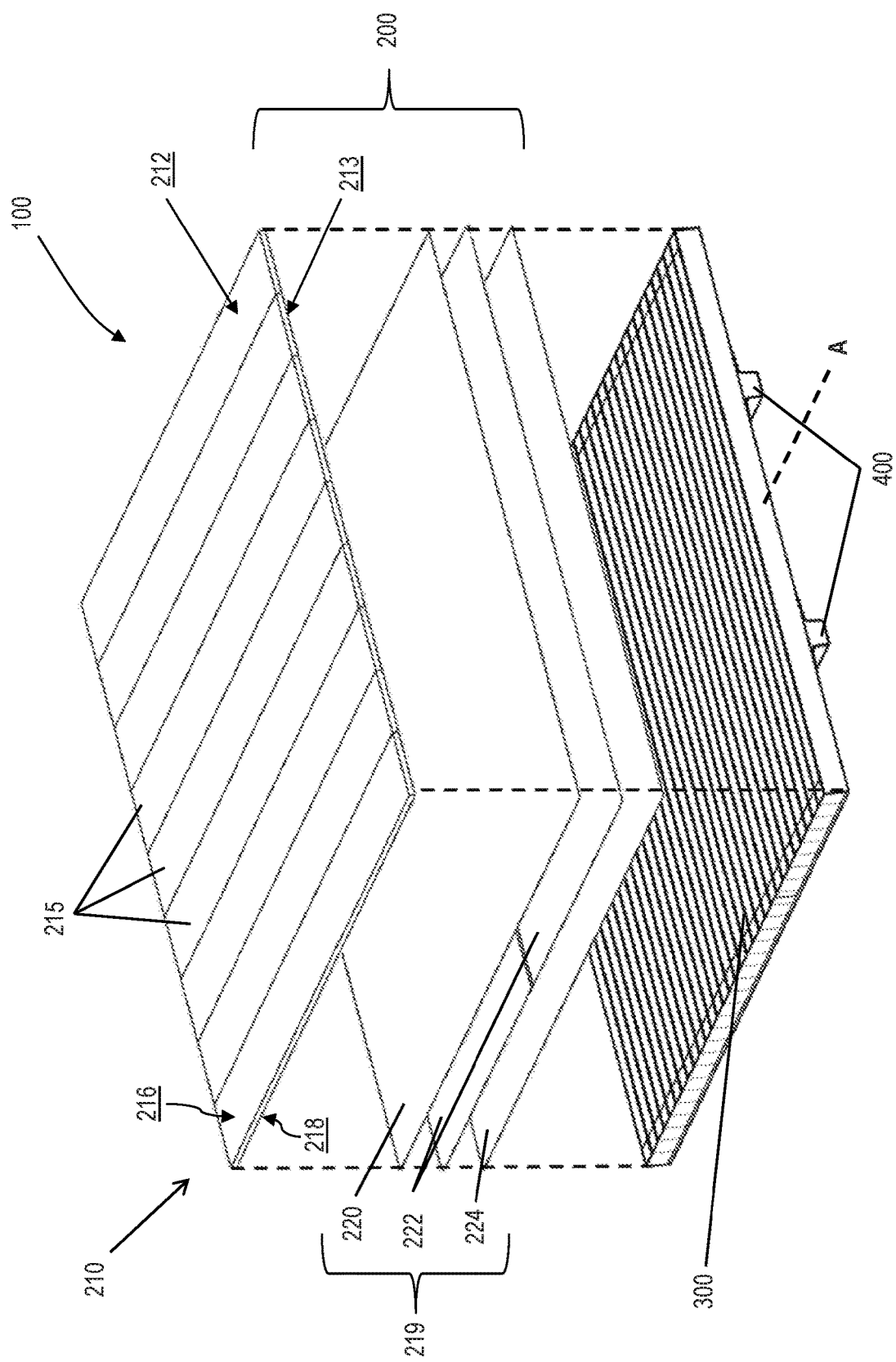
FIG. 2 is an exploded view of the composite floor structure of FIG. 1.

Referring initially to FIGS. 1 and 2, a composite floor structure 100 is shown. In certain embodiments, the composite floor structure 100 may be used in cargo vehicles for supporting and transporting cargo, including semi trailers (e.g., refrigerated semi trailers, dry freight semi trailers, flatbed semi trailers), other trailers, box trucks, or vans, and the like. In other embodiments, the composite floor structure 100 may be used to construct dump trucks or dump trailers, boat docks, mezzanines, storage units, temporary shelters, military platforms, air and space vehicles, automobiles, bridge decks, or buildings, for example. In other embodiments, the composite structure 100 may a used to construct blast panels, ballistic panels for use in viscoelastic damping, impact walls, or crash worthiness systems. Accordingly, those skilled in the art will appreciate that the present invention may be implemented in a number of different applications and embodiments and is not specifically limited in its application to the particular embodiments depicted herein.

The illustrative composite floor structure 100 is generally rectangular in shape, although this shape may vary. The composite floor structure 100 has a width W between a right side 102 and a left side 104. As shown in FIG. 1, the composite floor structure 100 has a length L between a front end 106 and a rear end 108. The composite floor structure 100 extends longitudinally from the front end 106 to the rear end 108 along a longitudinal axis A. The length L and the width W may vary depending on the needs of the particular application. In one embodiment, length L generally corresponds to a length of the cargo vehicle (e.g., 10-50 feet or more), and width W generally corresponds to a width of the cargo vehicle (e.g., 5-10 feet).

Turning now to FIG. 2, the illustrative composite floor structure 100 includes a deck or platform 200, a plurality of transverse beams 300 extending from the right side 102 to the left side 104 beneath the platform 200, and a plurality of longitudinal beams 400 extending from the front end 106 to the rear end 108 beneath the transverse beams 300. Transverse beams 300 extend perpendicular to the longitudinal axis A, and the longitudinal beams 400 extend parallel to the longitudinal axis A. In the exemplary embodiment shown, the longitudinal beams 400 extend downward from transverse beams 300.

In the illustrated embodiment, the composite floor structure 100 includes a plurality of transverse beams 300 and longitudinal beams 400, illustratively thirty transverse beams 300 and two longitudinal beams 400. It is understood, however, that the number of beams 300, 400 may vary depending on the needs of the particular application. Also, the size of each beam 300, 400, and the spacing between adjacent beams 300, 400, may vary depending on the needs of the particular application. For example, a relatively large number of closely-spaced beams 300, 400, may be used for high-weight/high-strength applications, whereas a relatively small number of spaced-apart beams 300, 400, may be used for low-weight/low-strength applications.

3. Composite Materials with Reinforcing Layers and/or Structural Preforms

The composite floor structure 100 may be constructed, at least in part, of composite materials. For example, the platform 200, the transverse beams 300, and/or the longitudinal beams 400 of the composite floor structure 100 may be constructed of composite materials. As such, the platform 200, the transverse beams 300, and/or the longitudinal beams 400 of the composite floor structure 100 may be referred to herein as composite structures. These composite structures may lack internal metal or wood components. Also, each composite structure may be a single, unitary component, which may be formed from a plurality of layers permanently coupled together. Exemplary composite materials for use in the composite floor structure 100 include fiber-reinforced plastics (FRP), for example carbon-fiber-reinforced plastics (CRP).

Each composite structure may contain one or more reinforcing layers that contains reinforcing fibers and is capable of being impregnated and/or coated with a laminating resin, as discussed in Section 7 below. Suitable fibers include carbon fibers, glass fibers, cellulose, or polymers, for example. The fibers may present in fabric form, which may be matt, woven, non-woven, or chopped, for example. Exemplary reinforcing layers include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Such fabrics are commercially available from Vectorply Corporation of Phenix City, Alabama.

According to an exemplary embodiment of the present disclosure, a plurality of different reinforcing materials may be stacked together and used in combination. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing layers may be stitched or otherwise coupled together to simplify manufacturing, to ensure proper placement, and to prevent shifting and/or bunching.

Also, certain composite structures may contain a structural support or preform. The preform may have a structural core that has been covered with an outer fabric layer or skin. The core may be extruded, pultruded, or otherwise formed into a desired shape and cut to a desired length. In an exemplary embodiment, the core is a polyurethane foam material or another foam material, and the outer skin is a spun bond polyester material. Exemplary preforms include PRISMA® preforms provided by Compsys, Inc. of Melbourne, Florida Advantageously, in addition to its structural effect, the foam core may have an insulating effect in certain applications, including refrigerated trucking applications. Both the core and the outer skin may be selected to accommodate the needs of the particular application. For example, in areas of the preform requiring more strength and/or insulation, a low-density foam may be replaced with a high-density foam or a hard plastic block.

4. Platform

The platform 200 may be constructed from a plurality of layers permanently coupled or laminated together. From top to bottom in FIG. 2, the illustrative platform 200 comprises a surface or top layer 210 and at least one reinforcing layer 219, illustratively a first reinforcing layer 220, a second reinforcing layer 222, and a third reinforcing layer 224. In the exemplary embodiment shown, the first reinforcing layer 220, the second reinforcing layer 222, and the third reinforcing layer 224 comprise a corresponding fiber reinforcing layer and a laminating resin material incorporated into and around the fiber reinforcing layer. In one exemplary embodiment, one or more of first reinforcing layer 220, second reinforcing layer 222, and third reinforcing layer 224 includes a co-cure adhesive resin as described in Section 3 above. In another exemplary embodiment, one or more of the first reinforcing layer 220, the second reinforcing layer 222, and the third reinforcing layer 224 includes a typical laminating resin. To accommodate different loads on the platform 200, each of the first reinforcing layer 220, the second reinforcing layer 222, and the third reinforcing layer 224 may be unique to provide a combination of different fiber types, sizes, and/or orientations across the platform 200. In the exemplary embodiment shown, the second reinforcing layer 222 is oriented generally orthogonal to each of the first reinforcing layer 220 and the third reinforcing layer 224. It is understood, however, that the number, types, locations, and orientation of these layers may vary depending on the needs of the particular application.

The top layer 210 of the platform 200 defines a generally flat upper surface 212 that faces upward for supporting cargo and other objects and a lower surface 213 opposite the upper surface 212. The upper surface 212 may include texture (e.g., dimpling or ridges) to provide increased surface roughness. In another embodiment, the upper surface 212 of top layer 210 may also include channels (i.e. ducts) extending through the interior of top layer 210 to provide increased surface roughness. According to an exemplary embodiment of the present disclosure, the top layer 210 is a wood panel or layer formed from a plurality of wood planks 215, which will be described in more detail in Section 5 below. The top layer 210 may be cut, machined, or otherwise formed into a desired width and a desired length. The top layer 210 is bonded to the first reinforcing layer 220 using one or more co-cure adhesives as described in Section 1 above.

Referring next to FIG. 3A, a sectional view of an exemplary embodiment of the platform 200 is shown. The top layer 210 is illustratively a wood layer bonded to the top reinforcing layer 220 by a co-cure adhesive layer 205. The co-cure adhesive layer 205 is illustratively a co-cure adhesive including one or more elastomer components, such as urethane, co-cured with one or more resin components, such as a vinyl ester, epoxy, or unsaturated polyester components, as described in Section 1 above. In some embodiments, the co-cure adhesive layer 205 may be fiber-reinforced. However, in other embodiments, the co-cure adhesive layer 205 need not be fiber-reinforced.

Referring next to FIG. 3B, a sectional view of another exemplary embodiment of the platform 200 is shown. The top layer 210 is illustratively a wood layer bonded to the top reinforcing layer 220 by a dual co-cure adhesive layer 205, illustratively co-cure adhesive layers 205A, 205B. It is understood, however, that the number and types these layers may vary depending on the needs of the particular application.

In one exemplary embodiment, the upper co-cure adhesive layer 205A and the lower co-cure adhesive layer 205B have different formulations and different stiffnesses. In a more particular embodiment, the upper layer 205A is formulated to be more rigid than lower layer 205B. This may be achieved, for example, by including less urethane content in the upper layer 205A than the lower layer 205B. Without wishing to be held to any particular theory, it is believed that including multiple co-cure adhesive layers 205A, 205B having increasing urethane content in the direction from the wood top layer 210 through the reinforcing layer 219 results in a more gradual transition in stiffness for the platform 200. An advantage, among others, of a gradual transition in stiffness is better toughness, survivability, energy absorption ability, and durability for the composite.

In another exemplary embodiment, each co-cure adhesive layer 205A, 205B is separately applied and cured. For example, the first co-cure adhesive layer 205A is applied to the wood top layer 210 and cured prior to application and curing of the second co-cure adhesive layer 205B. In this embodiment, the already-cured, first co-cure adhesive layer 205A may serve as a protective or sealant layer that prevents the second co-cure adhesive layer 205B and other resins from soaking into and/or around the wood top layer 210 during subsequent vacuuming and molding steps, as explained in Section 7 below.

5. Wood Top Layer

Referring back to FIGS. 1 and 2, and as described above, the top layer 210 includes the upper surface 212 and the lower surface 213 opposite the upper surface 212. According to an exemplary embodiment of the present disclosure, the top layer comprises a non-metallic material, illustratively a wood layer including the plurality of wood planks 215, which extend longitudinally along the length L and side-by-side across width W of the platform 200. More specifically, the wood planks 215 are arranged parallel to the longitudinal axis A and the longitudinal beams 400 of platform 200 and perpendicular to the transverse beams 300 of platform 200. Illustratively, the plurality of wood planks 215 comprises nine wood planks, but the number and size of wood planks 215 may vary depending on the needs of the particular application. For example, rather than assembling together multiple wood planks 215, the top layer 210 may be one solid sheet or panel of wood extending along the entire length L and across the entire width W of the platform 200. In another embodiment, the top layer 210 may include a number of wood planks 215 with a length shorter than the length L of the platform 200, so that multiple rows of wood planks 215 extend end-to-end along the length L of the platform 200. The wood planks 215 in adjacent columns may be staggered relative to one another. The wood planks 215 may be relatively thin with a thickness T (see FIG. 5) that is less than the thickness of the transverse beams 300 and/or the longitudinal beams 400 (see FIG. 2). Thus, the wood planks 215 may have a minimal impact on the weight of floor structure 100.

Each wood plank 215 has a length $L_B$ and a width $W_B$. Each wood plank 215 also includes an upper surface 216 generally corresponding to upper surface 212 of the collective top layer 210 and a lower surface 218 opposite the upper surface 216 and generally corresponding to lower surface 213 of the collective top layer 210. In the exemplary embodiment shown, the co-cure adhesive layer 205 (see FIG. 3A) is applied to the lower surface 218 of each wood plank 215 for bonding the lower surface 213 of the collective top layer 210 with the at least one reinforcing layer 219.

Referring now to FIGS. 3A-11, the lower surface 213 of the wood top layer 210 may include at least one engagement feature 250 configured to increase the surface area of lower surface 213. More specifically, and on an individual level, the lower surface 218 of each wood plank 215 may include at least one engagement feature 250 configured to increase the surface area of lower surface 218. Engagement features 250 are also configured to provide one or more surfaces that facilitate shear resistance rather than peel resistance by the co-cure adhesive, as adhesives often have stronger resistance to shear forces as opposed to peel forces. The engagement features 250 may be drilled, cut, or pressed into each lower surface 218.

In a first exemplary embodiment shown in FIGS. 4-5A, the engagement features 250 comprise channels or grooves 260 arranged parallel to length $L_B$ of wood plank 215. It is also within the scope of the present disclosure that the orientation of grooves 260 may be reversed, such that grooves 260 extend parallel to the width $W_B$ of wood plank 215. Each groove 260 has a generally U-shaped transverse cross-section open to lower surface 218. Each groove 260 includes a ceiling 261 and sidewalls 262 and extends into an interior of wood plank 215 to a depth D, which is a partial depth of an overall thickness T of wood plank 215. In the embodiment shown, each groove 260 extends into the interior of wood plank 215 to the same depth D. It is understood, however, that the depth D could vary for each groove 260.

When applied to lower surface 218 of wood plank 215, the co-cure adhesive layer 205 fills each groove 260. The sidewalls 262 of grooves 260, which are oriented generally perpendicularly to lower surface 218 of wood plank 215, provide a surface that facilitates increased shear resistance of the co-cure adhesive layer 205, as indicated by arrows 263 in FIG. 5A. In addition, grooves 260 increase the total surface area of lower surface 218 of wood plank 215 relative to a lower surface without engagement features 250. For at least these reasons, the co-cure adhesive layer 205 bonds with increased strength and more effectively to top layer 210 than a top layer 210 without engagement features.

In another embodiment shown in FIGS. 6-7A, the engagement features 250 comprise dovetail grooves 265 arranged parallel to length $L_B$ of wood plank 215. It is also within the scope of the present disclosure that the orientation of dovetail grooves 265 may be reversed, such that dovetail grooves 265 extend parallel to the width $W_B$ of wood plank 215. Each dovetail groove 265 comprises a generally dovetail shaped transverse cross-section open to lower surface 218 of wood plank 215 at opening 268. Dovetail grooves 265 extend into an interior of wood plank 215 to a depth D, which is a partial depth of an overall thickness T of wood plank 215. Each dovetail groove 265 includes a ceiling 266 and sidewalls 267 that are angled outward relative to each other from opening 268 toward ceiling 266 and angled acutely relative to the lower surface 218 of the wood plank 215. Because the sidewalls 267 are angled in this way, the ceiling 266 is longer than opening 268 of each dovetail groove 265. In the embodiment shown, each dovetail groove 265 extends into the interior of wood plank 215 to the same depth D. It is understood, however, that the depth D could vary for each dovetail groove 265. In addition, the angle of sidewalls 267 relative to each other and lower surface 218 of wood plank 215 may vary depending upon the application of top layer 210. That is, the angle of sidewalls 267 relative to each other and lower surface 218 may be greater or less than the angle illustrated.

When applied to lower surface 218 of wood plank 215, the co-cure adhesive layer 205 fills each dovetail groove 265. The angled sidewalls 267 of the dovetail grooves 265 provide surfaces that facilitate increased shear resistance of the co-cure adhesive layer 205, as indicated by arrows 269 in FIG. 7A. Because the ceiling 266 is longer than the opening 268, the dovetail grooves 265 also "lock" the co-cure adhesive layer 205 to lower surface 218 while providing increased peel resistance of the co-cure adhesive layer 205. In addition, dovetail grooves 265 increase the total surface area of the lower surface 218 of the wood plank 215 relative to a lower surface without engagement features. For at least these reasons, the co-cure adhesive layer 205 bonds with increased strength and more effectively to top layer 210 than a top layer 210 without engagement features.

In a further embodiment shown in FIGS. 8 and 9, the engagement features 250 comprise curved grooves 270 arranged generally parallel to length $L_B$ of the wood plank 215. The curved grooves 270 are similar to the above-described grooves 260 of FIGS. 4-5A, in that curved grooves 270 comprise a generally U-shaped transverse cross-section open to the lower surface 218. The curved grooves 270 extend into an interior of the wood plank 215 to a depth D, which is a partial depth of an overall thickness T of the wood plank 215. As the curved grooves 270 extend along the length $L_B$ of the wood plank 215, the curved grooves 270 curve back and forth along width $W_B$ in a serpentine pattern. It is also within the scope of the present disclosure that the orientation of curved grooves 270 may be reversed, such that curved grooves 270 extend generally parallel to the width $W_B$ of wood plank 215 and curve back and forth along the length $L_B$ of wood plank 215. In addition to providing surfaces that facilitate an increase in the shear resistance of the co-cure adhesive layer 205, the curved grooves 270 provide an increase in the total surface area of the lower surface 218 as a longitudinal length of curved grooves 270 is longer than length $L_B$ of wood plank 215. In another embodiment, the curved grooves 270 comprise a dovetail shaped transverse cross-section like the above-described dovetail grooves 265 of FIGS. 6-7A.

In another embodiment shown in FIGS. 10 and 11, the engagement features 250 comprise holes 280 arranged generally parallel to length $L_B$ and width $W_B$. The holes 280 extend into an interior of the wood plank 215 to a depth D, which is a partial depth of an overall thickness T of wood plank 215. The holes 280 provide an increase in the total surface area of the lower surface 218 of the wood plank 215. The holes 280 also provide surfaces that facilitate an increase in the shear resistance of the co-cure adhesive layer 205 relative to a lower surface 218 without engagement features. In the illustrated embodiment, the lower surface 218 includes thirty-six holes 280 arranged in a six-by-six grid pattern. It is understood, however, that the number, size, spacing, and location of the holes 280 may vary depending on the needs of the particular application. For example, the holes 280 may be drilled in a skew or a diagonal pattern across the lower surface 218 of the wood plank 215. The holes 280 may also be drilled to variable depths within the interior of the wood plank 215.

In the embodiments of engagement features 250 shown in FIGS. 4-11, grooves 260, dovetail grooves 265, and curved grooves 270 extend generally in a direction parallel to length $L_B$ along lower surface 218 from a first end 228 of wood plank 215 to a second end 230 of wood plank 215. More-over, each of the embodiments of grooves 260, dovetail grooves 265, and curved grooves 270 comprise a plurality of parallel of rows, illustratively eleven rows, extending from first end 228 to second end 230 of wood plank 215. It is contemplated, however, that the number, size, location, spacing, and orientation of engagement features 250 on lower surface 218 of wood plank 215 may vary depending on the needs of the particular application. For example, grooves 260, dovetail grooves 265, and curved grooves 270 may extend parallel to length $L_B$ without extending fully to at least one of first end 228 or second end 230 of wood plank 215. In one embodiment, engagement features 250 may be comprise a texturing added to lower surface 218 of wood plank 215, for example, cuts, scratches, channels, scores, or indentations. In a further embodiment, engagement features 250 may comprise protrusions or other features extending outwardly from lower surface 218 of wood plank 215

Grooves 260, dovetail grooves 265, curved grooves 270, and holes 280 may also vary in shape and orientation. In one embodiment, grooves 260, dovetail grooves 265, and curved grooves 270 may extend both longitudinally and transversely across lower surface 218 of wood plank 215, thereby forming a crossed or square pattern. In a further embodiment, grooves 260, dovetail grooves 265, and curved grooves 270 may extend non-parallel to length $L_B$ and width $W_B$ of wood plank 215, thereby forming a skew pattern. In another embodiment, holes 280 are arranged stochastically across lower surface 218 of wood plank 215.

In a further embodiment, grooves 260, dovetail grooves 265, and curved grooves 270 may be used in combination with one another. For example, curved grooves 270 may also be dovetail grooves 265 to gain the advantages of both groove types. In a further embodiment, lower surface 218 of wood plank 215 may include different types, sizes, and orientations of grooves 260, dovetail grooves 265, and curved grooves 270 in the same embodiment. In another embodiment, each of the plurality of wood planks 215 may comprise different engagement features 250. For example, a subset of wood planks 215 closest to sides 102, 104 (FIG. 1) of top layer 210 may comprise dovetail grooves 265 or curved grooves 270, while a laterally interior subset of wood planks 215 may comprise grooves 260 or holes 280. In a further embodiment, lower surface 218 of wood plank 215 may comprise holes 280 and at least one of grooves 260, dovetail grooves 265, and curved grooves 270.

6. Beams

Referring back to FIGS. 1 and 2, beams 300, 400 may be constructed from a plurality of layers permanently coupled or laminated together. In one exemplary embodiment, beams 300, 400 are prism-shaped preforms, each preform including an inner foam core made of a self-expanding and self-curing structural foam material, an intermediate or transition layer made of a nonwoven fabric, and an outer layer made of a fiber-reinforcing material capable of being impregnated and/or coated with the surrounding laminating resin. Exemplary preforms for use as beams 300, 400 include PRISMA® preforms provided by Compsys, Inc. of Melbourne, Florida Beams 300, 400 may provide stiffness and resistance to bending and deflection of platform 200. Beams 300, 400, may also serve as a connection point for another structure, such as a vehicle chassis, a wheel assembly, a landing gear, or a slide rail typical in trucking applications. Exemplary transverse beams 300 and longitudinal beams 400 are provided in US Publication No. 2017/0239916, the disclosure of which is hereby expressly incorporated by reference in its entirety.

7. Molding Process

Figure 12:
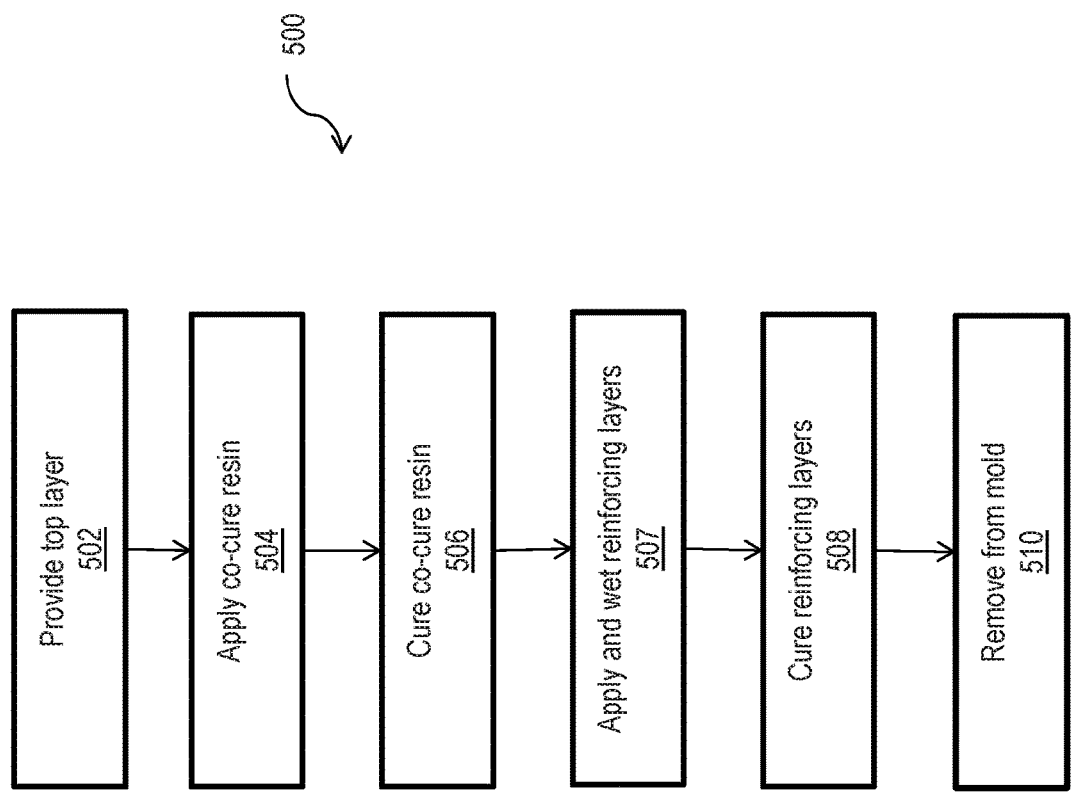
FIG. 12 illustrates an exemplary molding process for forming the platform of FIG. 1.

Referring next to FIG. 12, the composite floor structure 100 may be formed by a molding process 500. The molding process 500 will also be described with reference to FIGS. 1-3B.

As shown in block 502, the top layer 210 is provided, which illustratively comprises the plurality of wood planks 215. In one exemplary embodiment, the lower surface 213 of the wood top layer 210, illustratively the lower surfaces 218 of the wood planks 215, contains engagement features 250, as set forth in Section 5 above. It is also within the scope of the present disclosure for the lower surfaces 218 of the wood planks 215 to be roughened (e.g., sanded), cleaned (e.g., with acetone), or otherwise pretreated to receive the co-cure adhesive layer 205.

As shown in block 504, a co-cure adhesive, such as co-cure adhesive layer 205, is applied to lower surface 213 of the top layer 210, illustratively the lower surfaces 218 of the wood planks 215. During this applying step of block 504, the co-cure adhesive layer 205 enters and substantially or entirely fills the engagement features 250.

As shown in block 506, co-cure adhesive layer 205 is allowed to at least partially cure upon lower surface 213 of the top layer 210. Exemplary curing methods include allowing the co-cure adhesive to air-cure at room temperature, as well as accelerated curing methods such as heat curing, light curing, UV curing, and other suitable methods. In one exemplary embodiment, a single co-cure adhesive layer 205 is applied to and cured on lower surface 213 of the top layer 210, as illustrated in FIG. 3A. In another exemplary embodiment, multiple co-cure adhesive layers, illustratively co-cure adhesive layers 205A, 205B, are sequentially applied, as illustrated in FIG. 3B. As noted above, block 506 may involve a two-step curing process, in which the first co-cure adhesive layer 205A is cured first without vacuum assistance to serve as a protective or sealant layer upon the wood top layer 210, and then the second co-cure adhesive layer 205B is cured upon the already-cured, first co-cure adhesive layer 205A. In another exemplary embodiment, block 506 is eliminated such that the co-cure adhesive layer is not cured prior to application of the reinforcing layers in block 507, and the co-cure adhesive and reinforcing layer are cured together in block 508.

As shown in block 507, the at least one reinforcing layer 219, such as the first reinforcing layer 220, the second reinforcing layer 222, and the third reinforcing layer 224, are placed in the mold atop the co-cure adhesive layer 205 (see FIG. 3A) or the co-cure adhesive layer 205B (see FIG. 3B) to form the rest of composite floor structure 100. The transverse beams 300 and/or the longitudinal beams 400 may also be stacked upon the at least one reinforcing layer 219 during this applying step of block 507. The at least one reinforcing layer 219, the transverse beams 300, and/or the longitudinal beams 400 are wet with at least one laminating resin and a catalyst to impregnate and/or coat the at least one reinforcing layer 219, the transverse beams 300, and/or the longitudinal beams 400. This wetting process may involve applying a vacuum to pull the laminating resin through the at least one reinforcing layer 219, the transverse beams 300, and/or the longitudinal beams 400. In one exemplary embodiment, the materials are wet with a co-cure adhesive resin as described in Section 1 above. In another exemplary embodiment, the materials are wet with a typical laminating resin. In certain embodiments, a plurality of co-curing resins may be selectively distributed throughout the composite floor structure 100 during the molding process. For example, areas of the composite floor structure 100 that will be susceptible to high stress may receive a resin with a relatively higher polyurethane content, whereas other areas of the composite floor structure 100 that provide bulk and section modulus may receive a lower cost rigid, polyester-based resin, such as an isophthalic polyester resin.

As shown in block 508, the laminating resin and catalyst are cured to form the composite floor structure 100, which is removed from the mold in block 510. Exemplary curing methods include allowing the laminating resin to air-cure at room temperature, as well as accelerated curing methods such as heat curing, light curing, UV curing, and other suitable methods. Advantageously, the laminating resin that is used in block 507 is also capable of coupling directly to the co-cure adhesive layer 205 (see FIG. 3A) or the co-cure adhesive layer 205B (see FIG. 3B) from block 504 to form a hybrid laminated wood fiber-reinforced composite floor structure 100. In certain embodiments, the curing step of block 508 may be performed after the co-curing step of block 506. In other embodiments, the curing step of block 508 may be performed simultaneously (in whole or in part) with the co-curing step of block 506. For example, with reference to FIGS. 3B and 12, a first part of the co-curing step of block 506 may be performed to cure the first co-cure adhesive layer 205A and form a protective or sealant layer upon the wood top layer 210, and then a second part of the co-curing step of block 506 and the curing step of block 508 may be performed together to simultaneously cure the second co-cure adhesive layer 205B and the laminating resin of the reinforcing layers 219 upon the already-cured first co-cure adhesive layer 205A.

A significant advantage of the molding process 500 is the ability for the wood top layer 210 to define at least part of the mold for forming the rest of the composite floor structure 100. A skirt may be applied around the perimeter of the wood top layer 210 to further define the mold. The co-cure adhesive layer 205, the reinforcing layer 219, the transverse beams 300, and/or the longitudinal beams 400 may be applied onto the lower surface 213 of the wood top layer 210 during the applying steps of blocks 504 and 507 and integrally molded together during the curing steps of blocks 506 and 508. In this way, the rest of the composite floor structure 100 may be molded directly upon the wood top layer 210. This direct molding process 500 eliminates the need for traditional metal or composite molds that are expensive, fragile, and repeatedly separated from the molded structures and allows use of less expensive, wood parts requiring minimal support during the molding process 500, while also taking advantage of the broad operating temperatures and times associated with co-curing. Of course, the wood top layer 210 serves a dual purpose as a functional surface layer after the molding process 500.

In another embodiment, individual pieces of the composite floor structure 100 may be molded and then coupled together using, for example, structural adhesive and/or mechanical fasteners. Exemplary mechanical fasteners include, but are not limited to, bolts, screws, and rivets.

In one exemplary embodiment, the molding process 500 further includes coating the upper surface 212 of wood top layer 210. In a more particular embodiment, the upper surface 212 is pre-coated prior to application of the reinforcing layers in block 507. In another more particular embodiment, the upper surface 212 is post-coated after application of the reinforcing layers in block 507. In some exemplary embodiments, the coating is a co-cure adhesive resin as described in Section 1 above, which serves as an exposed gel coat.

The non-wooden areas of composite floor structure 100, such as transverse beams 300 and longitudinal beams 400, may also be coated. In one embodiment, the non-wooden areas are coated with a co-cure adhesive resin as described in Section 1 above, which serves as an exposed gel coat. The urethane content of the co-cure adhesive resin may vary depending on whether the resin is used to coat a wooden surface or a non-wooden surface. In another embodiment, the non-wooden areas are coated with a traditional gel coat.

When composite floor structure 100 is part of a cargo vehicle, for example, a similar method may be performed using similar materials to construct other elements of the cargo vehicle, such as the nose, sidewalls, and/or roof.

Additional information regarding the construction of the composite floor structure 100 is disclosed in the following patents and published patent applications, each of which is incorporated by reference in its entirety herein: U.S. Pat. Nos. 5,429,066; 5,664,518; 5,800,749; 5,830,308; 5,897,818; 5,908,591; 6,004,492; 6,013,213; 6,206,669; 6,496,190; 6,497,190; 6,543,469; 6,723,273; 6,755,998; 6,869,561; 6,911,252; 8,474,871; 9,371,468; and 10,239,265.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A composite structure, comprising:
 a fiber-reinforced plastic;
 a wood layer, the wood layer including an uppermost surface and a lowermost surface opposite the uppermost surface, at least a portion of the lowermost surface including at least one engagement feature; and
 a co-cure adhesive layer applied to the lowermost surface of the wood layer and the at least one engagement feature, the co-cure adhesive layer bonding the fiber-reinforced plastic and the wood layer, wherein the co-cure adhesive layer comprises at least one elastomer and at least one resin selected from a vinyl ester resin, a polyester resin, and an epoxy resin.

2. The composite structure of claim 1, wherein the at least one engagement feature comprises a groove.

3. The composite structure of claim 2, wherein the groove comprises a dovetail groove.

4. The composite structure of claim 2, wherein a transverse cross-section of the groove is U-shaped.

5. The composite structure of claim 2, wherein the at least one engagement feature comprises a plurality of holes.

6. The composite structure of claim 5, wherein the holes are arranged in a grid pattern across the lowermost surface.

7. The composite structure of claim 1, wherein the fiber-reinforced plastic is a laminate structure comprising:
 a plurality of reinforcing layers; and
 a plurality of transverse beams;
 wherein the wood layer is thinner than the plurality of transverse beams.

8. The composite structure of claim 1, wherein the elastomer is urethane.

9. The composite structure of claim 8, wherein the elastomer comprises from 5 wt. % to 95 wt. % of the total weight of the co-cure adhesive.

10. The composite structure of claim 8, wherein the elastomer comprises from 10 wt. % to 25 wt. % of the total weight of the co-cure adhesive.

11. The composite structure of claim 8, wherein the elastomer comprises from 50 wt. % to 95 wt. % of the total weight of the co-cure adhesive.

12. The composite structure of claim 1, wherein the wood layer comprises a plurality of wood planks.

13. The composite structure of claim 12, wherein each of the plurality of wood planks includes the at least one engagement feature.

14. A composite floor structure comprising:
a platform having:
  an upper wood layer, the upper wood layer including a lowermost surface having at least one engagement feature;
  at least one fabric-reinforced plastic layer positioned adjacent the lowermost surface of the upper wood layer; and
  a co-cure adhesive layer applied to the lowermost surface of the upper wood layer, the co-cure adhesive layer bonding the lowermost surface of the upper wood layer and the at least one fabric-reinforced plastic layer, wherein the co-cure adhesive layer comprises at least one elastomer and at least one resin selected from a vinyl ester resin, a polyester resin, and an epoxy resin.

15. The composite floor structure of claim 14, further comprising a plurality of transverse beams integrally molded to the platform, the plurality of transverse beams positioned adjacent the at least one fabric-reinforced plastic layer such that the at least one fabric-reinforced plastic layer is disposed between the upper wood layer and the plurality of transverse beams.

16. The composite floor structure of claim 14, wherein the at least one engagement feature of the lower surface comprises a plurality of grooves, and wherein the co-cure adhesive layer substantially fills each of the plurality of grooves of the wood surface.

* * * * *